US010673295B2

(12) United States Patent
Looi et al.

(10) Patent No.: US 10,673,295 B2
(45) Date of Patent: Jun. 2, 2020

(54) ROTOR, MOTOR AND ELECTRIC TOOL UTILIZING THE SAME

(71) Applicant: Johnson Electric S.A., Murten (CH)

(72) Inventors: Wan Hor Looi, Hong Kong (CN); Chong Wei Chan, Hong Kong (CN); Yuan Tian, Shenzhen (CN); Yan Ju Dong, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 260 days.

(21) Appl. No.: 15/623,017

(22) Filed: Jun. 14, 2017

(65) Prior Publication Data

US 2017/0366061 A1 Dec. 21, 2017

(51) Int. Cl.
*H02K 21/12* (2006.01)
*H02K 5/02* (2006.01)
*H02K 5/18* (2006.01)
*H02K 1/27* (2006.01)
*H02K 7/14* (2006.01)
*B27B 17/08* (2006.01)
*H02K 1/30* (2006.01)

(52) U.S. Cl.
CPC .............. *H02K 5/02* (2013.01); *B27B 17/08* (2013.01); *H02K 1/2786* (2013.01); *H02K 1/30* (2013.01); *H02K 5/18* (2013.01); *H02K 7/145* (2013.01)

(58) Field of Classification Search
CPC ................................. H02K 1/27; H02K 1/276
USPC ......................................... 310/156.01, 156.08
See application file for complete search history.

(56) References Cited

U.S. PATENT DOCUMENTS

| 5,375,651 A | * | 12/1994 | Colwell | F04D 25/082 |
| | | | | 110/162 |
| 5,864,191 A | * | 1/1999 | Nagate | H02K 1/276 |
| | | | | 310/156.53 |
| 7,898,136 B2 | * | 3/2011 | Poulin | H02K 1/2786 |
| | | | | 310/156.08 |
| 7,923,881 B2 | * | 4/2011 | Ionel | H02K 21/46 |
| | | | | 310/156.53 |

(Continued)

FOREIGN PATENT DOCUMENTS

| CN | 202309274 U | 7/2012 |
| FR | 2503950 A1 | 10/1982 |

(Continued)

OTHER PUBLICATIONS

Chinese Office Action based on corresponding Application No. 201610416651.8; dated Nov. 8, 2019.

*Primary Examiner* — Alexander Talpalatski
(74) *Attorney, Agent, or Firm* — Muncy, Geissler, Olds & Lowe, P.C.

(57) ABSTRACT

A rotor includes a yoke, an end cap, and a rotary shaft. The yoke is fixed relative to the end cap. The rotary shaft extends into the yoke. One end of the rotary shaft is connected to the end cap. The end cap is formed on the yoke and the rotary shaft by injection molding. The present invention further provides a motor and an electric tool including the rotor. In the rotor of this invention, the end cap is formed by injection molding, and the yoke and the rotary shaft are connected into a whole at the same time of forming the end cap. The traditional aluminium end cap is replaced with the molded end cap, which makes the rotor easier to fabricate and have a lighter weight and lower cost.

12 Claims, 8 Drawing Sheets

(56) References Cited

U.S. PATENT DOCUMENTS

| | | | |
|---|---|---|---|
| 8,677,606 B2* | 3/2014 | Desiron | H02K 15/03 29/598 |
| 9,136,736 B2* | 9/2015 | Hoemann | H02K 1/2786 |
| 9,472,985 B2* | 10/2016 | Kawaji | H02K 1/276 |
| 9,548,644 B2* | 1/2017 | Nagai | H02K 15/03 |
| 9,590,459 B2* | 3/2017 | Hoemann | H02K 1/2786 |
| 2008/0232983 A1* | 9/2008 | Yamazaki | F04D 25/0613 417/354 |
| 2010/0264758 A1* | 10/2010 | Strohm | H02K 1/2786 310/43 |
| 2013/0009494 A1 | 1/2013 | Oguma | |
| 2013/0181564 A1* | 7/2013 | Uchitani | H02K 1/276 310/156.08 |
| 2014/0062243 A1* | 3/2014 | Falk | H02K 1/276 310/156.08 |
| 2014/0241914 A1* | 8/2014 | Ojima | H02K 1/276 417/410.1 |
| 2014/0354103 A1* | 12/2014 | Kang | H02K 1/2773 310/156.38 |
| 2015/0180298 A1* | 6/2015 | Horst | H02K 21/16 310/91 |
| 2015/0303753 A1 | 10/2015 | Huang et al. | |

FOREIGN PATENT DOCUMENTS

| | | |
|---|---|---|
| JP | 2006014520 A | 1/2006 |
| JP | 201576956 A | 4/2015 |
| WO | WO 2012119284 A1 | 9/2012 |

* cited by examiner

ROTOR, MOTOR AND ELECTRIC TOOL UTILIZING THE SAME

CROSS REFERENCE TO RELATED APPLICATIONS

This non-provisional patent application claims priority under 35 U.S.C. § 119(a) from Patent Application No. 201610416651.8 filed in The People's Republic of China on Jun. 15, 2016.

FIELD OF THE INVENTION

The present invention relates to the field of motors, and in particular to a rotor of a motor, and a motor and an electric tool utilizing the rotor.

BACKGROUND OF THE INVENTION

There are many types of motors, such as outer-rotor motors. Wherein the rotor of the outer-rotor motor usually includes a yoke, a permanent magnet mounted to the yoke, an end cap connected to the yoke, and a rotary shaft connected to the end cap. However, the end caps of the rotors are mostly made of aluminum alloy, which leads to high cost and large weight of the rotor. In addition, fixing the permanent magnet relative to the yoke requires the use of glues. However, it can be hard to control the amount of the glues used. Furthermore, the yoke is formed by stacking a plurality of laminations, and the laminations need to be fixed by fixing pins passing through holes defined through the respective laminations. As a result, the fabrication of the yoke can be troublesome.

SUMMARY OF THE INVENTION

Accordingly, there is a desire for an improved rotor, and a motor and an electric tool having the rotor.

In one aspect, a rotor is provided which includes a yoke, an end cap, and a rotary shaft. The yoke is fixed relative to the end cap. The rotary shaft extends into the yoke. One end of the rotary shaft is connected to the end cap. The end cap is formed on the yoke and the rotary shaft by injection molding.

Preferably, the yoke defines a plurality of receiving slots along an axial direction of the yoke. Each of the receiving slots receives a permanent magnet therein, and the permanent magnet is fixed in the yoke at the time of the injection molding.

Preferably, the yoke comprises a plurality of first laminations and a second lamination. The yoke defines a plurality of first receiving slots through the first laminations along an axial direction of the yoke. Each of the first receiving slots receives a permanent magnet therein, one end of the permanent magnet abuts against the second lamination, and the permanent magnet is fixed in the yoke at the time of the injection molding.

Preferably, the yoke defines a second receiving slot through the second lamination corresponding to each first receiving slot, and a width of the second receiving slot is less than a width of the permanent magnet.

Preferably, a plurality of protrusions protrudes from one side of the first lamination facing the second lamination. The other side of the first lamination forms a plurality of connecting grooves corresponding to the protrusions. One side of the second lamination facing the first lamination defines a plurality of through slots corresponding to the protrusions of the first lamination.

Preferably, the end cap comprises a bottom wall, a lateral wall, and an annular bracket. The rotary shaft is connected to the bottom wall. The annular bracket is connected to an inner side of the lateral wall. The annular bracket comprises two annular plates and a plurality of fixing poles. The plurality of fixing poles is disposed between and connected to the two annular plates, and the fixing poles extend through the yoke and are immediately adjacent the permanent magnets.

Preferably, one of the two annular plates is connected to the inner side of the lateral wall, and the other annular plate is disposed at one end of the lateral wall away from the bottom wall and disposed outside the lateral wall.

Preferably, a plurality of grooves is defined in an inner surface of the yoke along the axial direction of the yoke. The annular bracket includes a plurality of connecting poles corresponding to the grooves. The plurality of connecting poles is disposed between and connected to the two annular plates. Each of the connecting poles is received in a corresponding one of the grooves.

Preferably, the end cap further comprises a plurality of vanes. One end of each vane is connected to the bottom wall, and the other end of each vane is connected to the lateral wall. An opening is defined between adjacent vanes, and airflow produced by rotation of the vanes enters an interior of the rotor via the opening to dissipate heat of the rotor.

Preferably, the permanent magnet is rectangular in shape.

In another aspect, a motor is provided which includes the rotor described above. The motor further includes a stator. The stator includes a stator core and a plurality of stator windings. The stator windings are wound around the stator core, and the stator core is received in the yoke.

In still another aspect, an electric tool is provided which includes a permanent magnet motor.

Preferably, the electric tool is an electric saw comprising a saw blade, and the motor is configured to drive the saw blade.

In the rotor of this invention, the end cap is formed by injection molding, and the yoke and the rotary shaft are connected into a whole at the same time of forming the end cap. The traditional aluminum end cap is replaced with the molded end cap, which makes the rotor easier to fabricate and have a lighter weight and lower cost.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present invention, any other embodiment obtained by a person skilled in the art without paying any creative effort shall fall within the protection scope of the present invention.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component.

Unless otherwise specified, all technical and scientific terms have the ordinary meaning as commonly understood by people skilled in the art. The terms used in this disclosure are illustrative rather than limiting. The term "and/or" used in this disclosure means that each and every combination of one or more associated items listed are included.

Figure 1:
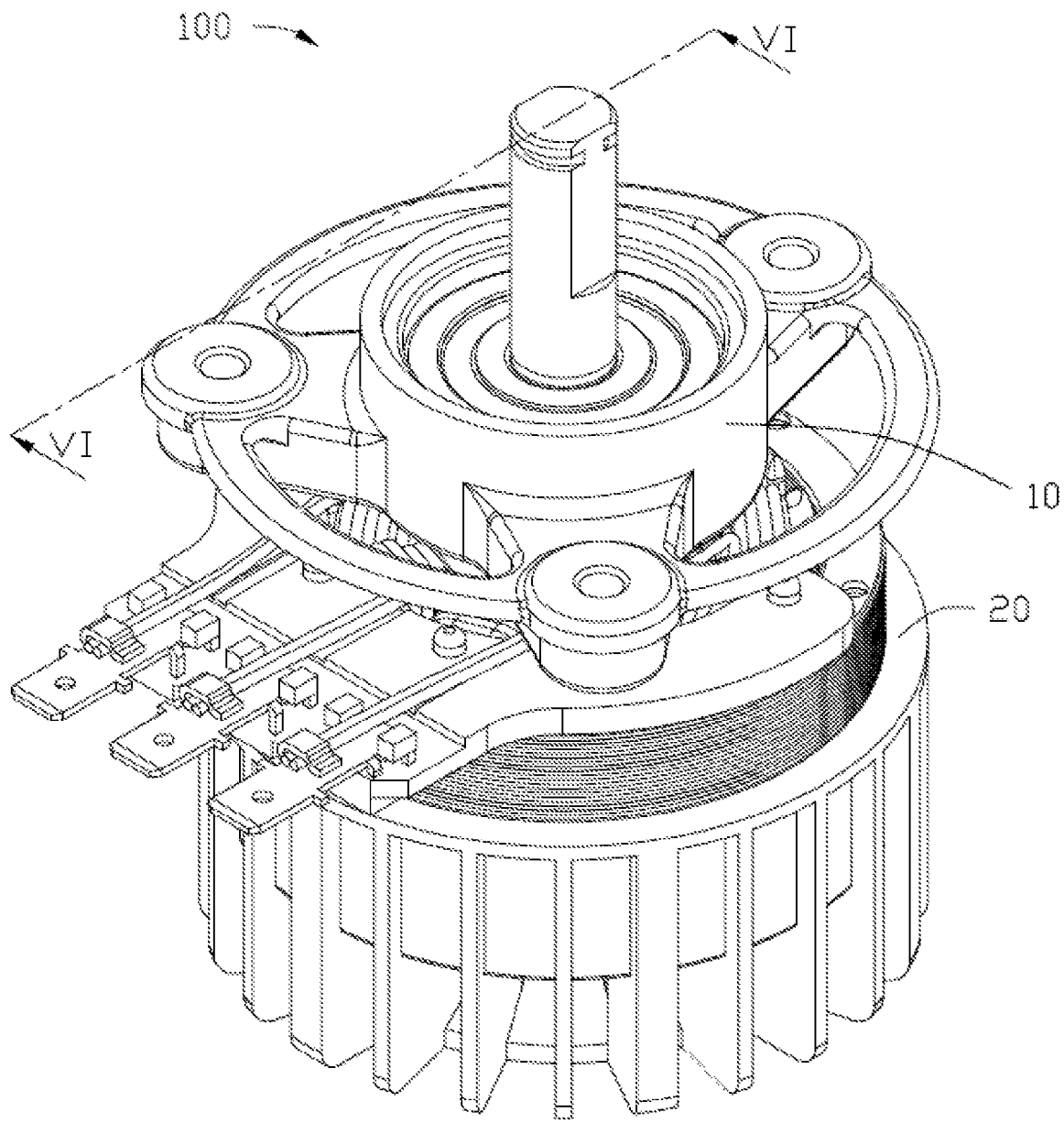
FIG. 1 is a perspective view of a motor according to one embodiment of the present invention.

FIG. 1 illustrates a motor 100 in accordance with one embodiment of the present invention. The motor 100 includes a stator 10 and a rotor 20. The stator 10 is received in the rotor 20, and the rotor 20 is rotatable relative to the stator 10. In at least one embodiment, the motor 100 is an outer-rotor permanent magnet motor.

Figure 2:
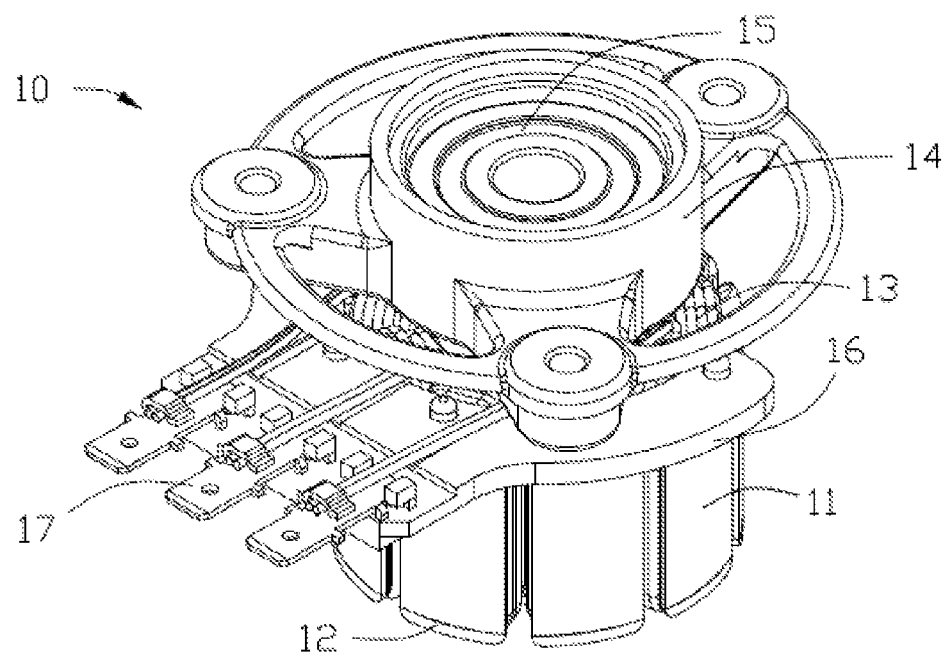
FIG. 2 is a perspective view of a stator and a rotor of the motor of FIG. 1.
Figure 2:
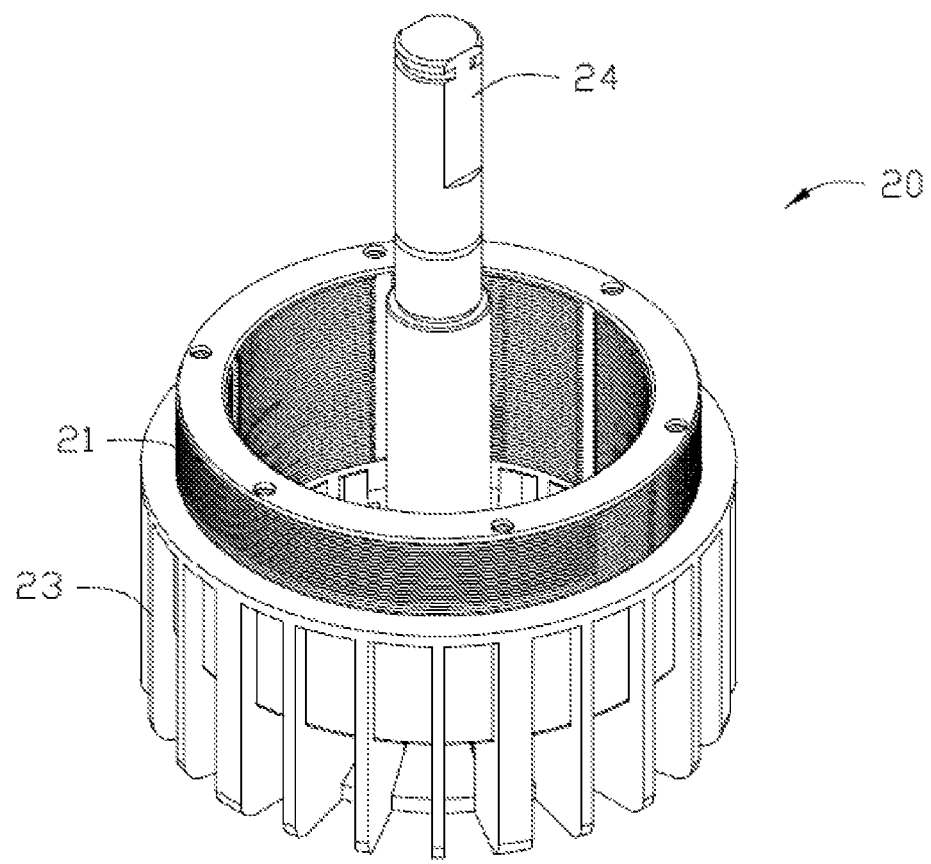
Figure 3:
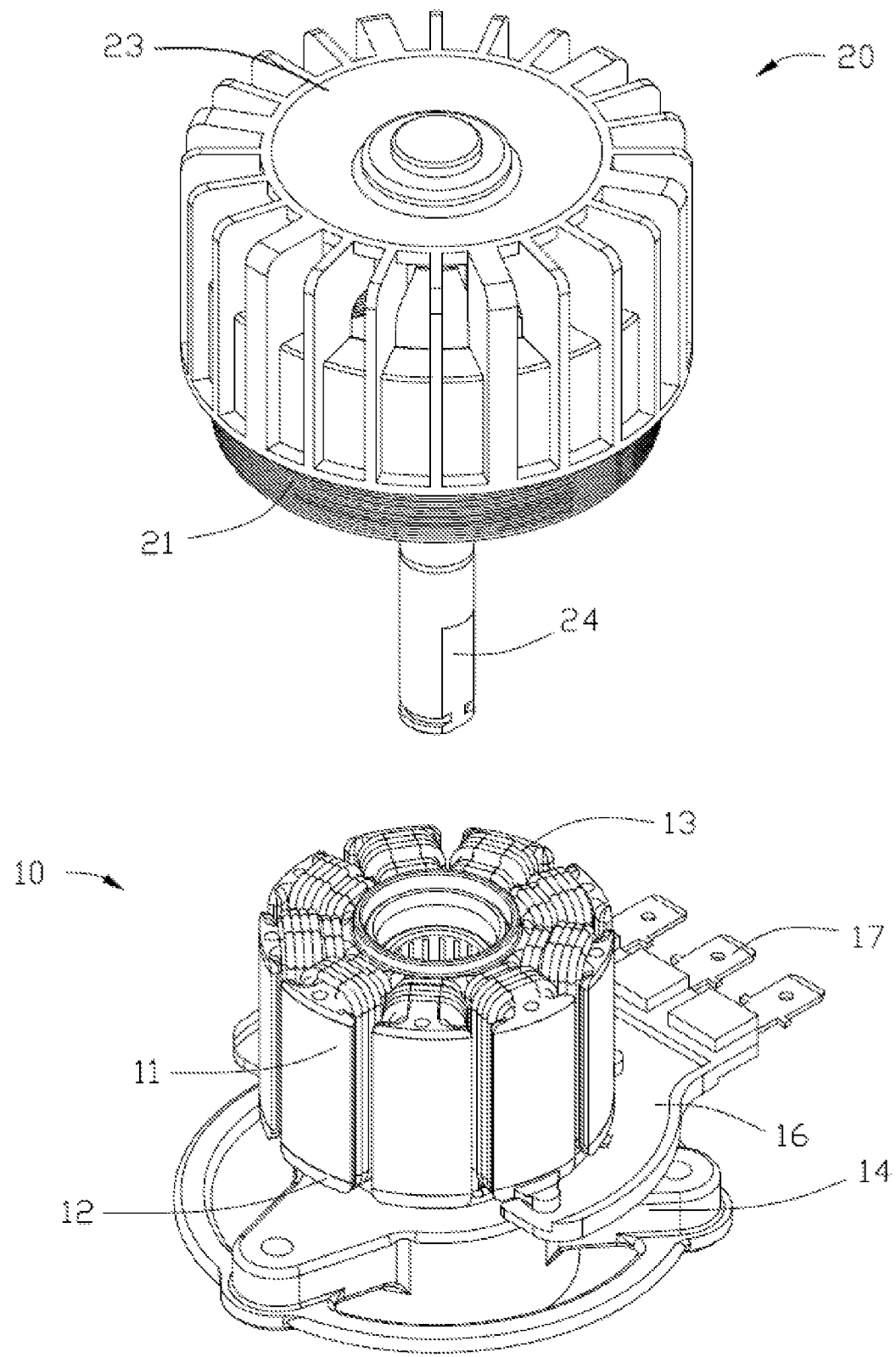
FIG. 3 is a perspective view of a stator and a rotor of the motor of FIG. 1, viewed from another aspect.
Figure 6:
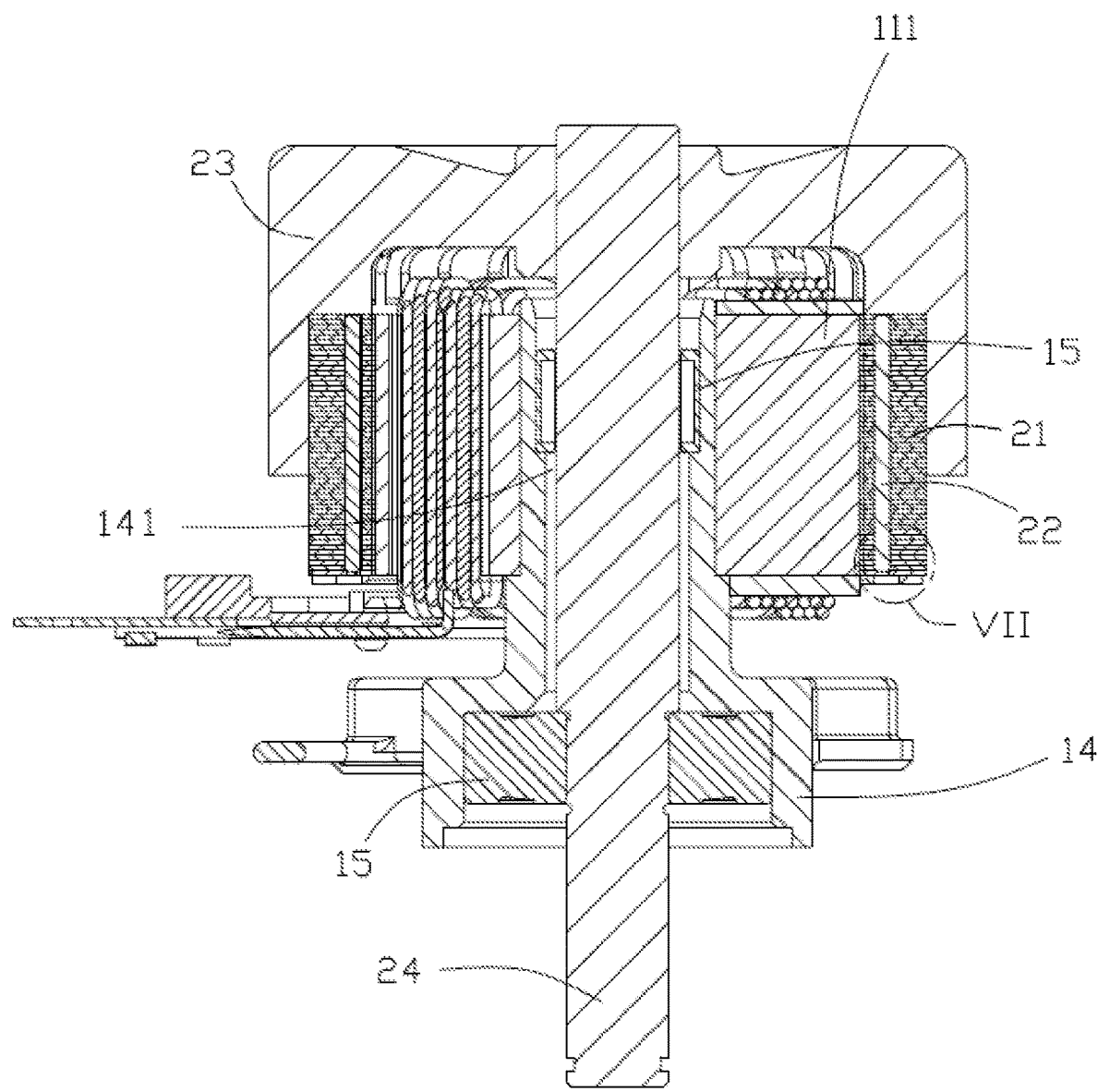
FIG. 6 is a sectional view of the motor of FIG. 1, taken along line VI-VI thereof.

Referring to FIGS. 2-3 and 6, the stator 10 includes a stator core 11, a winding bracket 12, stator windings 13, and a fixing bracket 14.

The stator core 11 includes a plurality of stator teeth 111 arranged at even intervals. In at least one embodiment, the stator core 11 is exemplarily illustrated as including nine stator teeth 111. The number of the stator teeth 111 is not limited and, in other embodiments, the number of the stator teeth 111 may be adjusted in accordance with needs.

The winding bracket 12 is configured to accommodate the stator core 11. In at least one embodiment, the winding bracket 12 is formed by injecting plastic or rubber over an outer surface of the stator core 11.

The number of the stator windings 13 is equal to the number of the stator teeth 111, and each stator winding 13 is wound around a corresponding one of the stator teeth 111.

One end of the fixing bracket 14 extends into the winding bracket 12 with the stator core 11 mounted therein, with the stator core 11 and the winding bracket 12 non-rotatable relative to the fixing bracket 14. The other end of the fixing bracket 14 is used for connection with an external element (not shown) so as to fix the stator 10 to the external element. An accommodating hole 141 is defined through a substantially central area of the fixing bracket 14 in an axial direction thereof. A bearing 15 is received in each of two ends of the accommodating holes 141.

In at least one embodiment, the stator 10 further includes a connecting plate 16 which is substantially in the form of a half circular arc. The connecting plate 16 is connected to the winding bracket 12, and a plurality of terminals 17 is mounted to one side of the connecting plate 16. In this embodiment, the number of the terminals 17 is three, each terminal 17 is used to electrically connect with one stator winding 13, and a wire of one phase leads out from each terminal 17.

Figure 4:
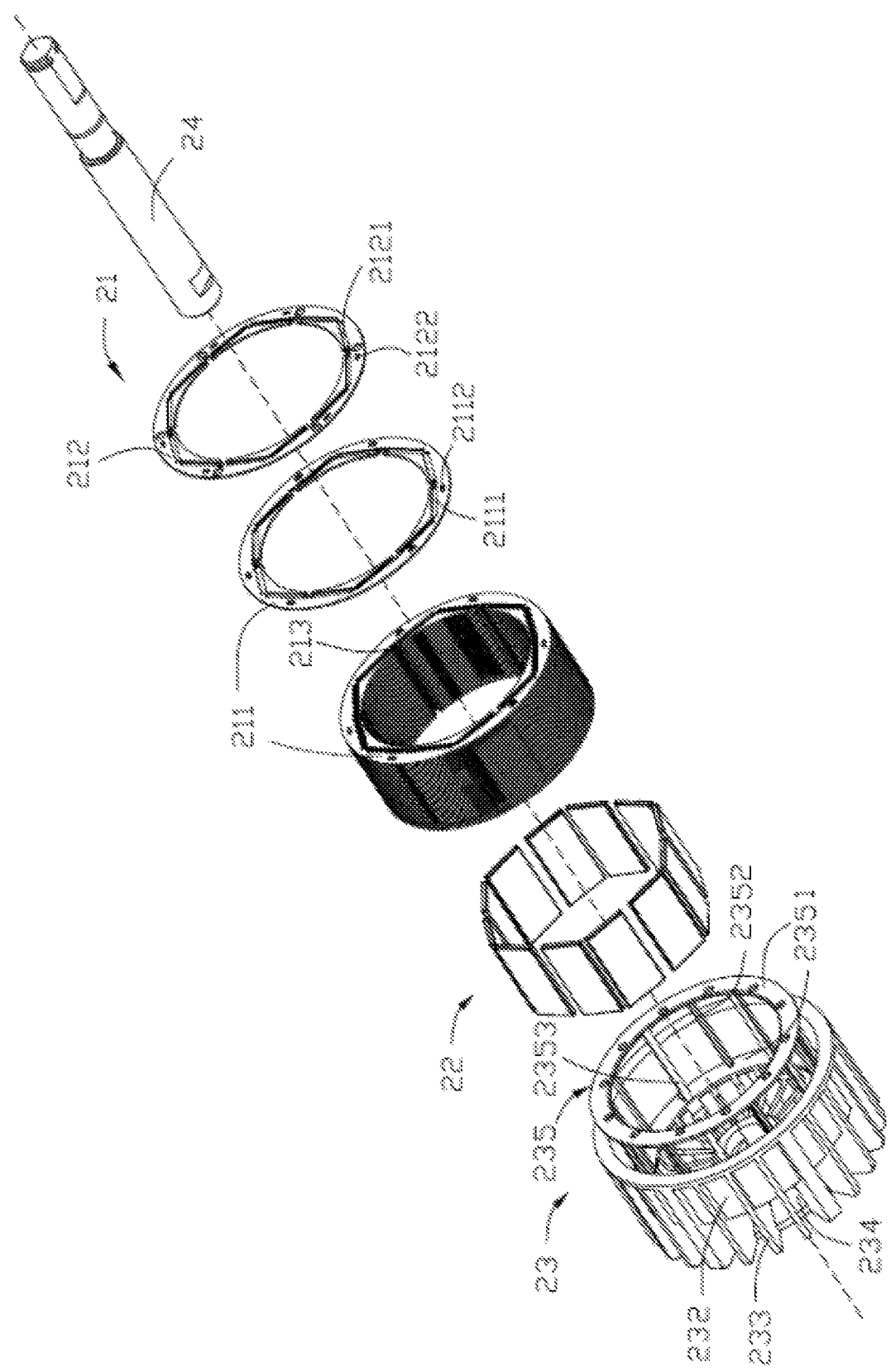
FIG. 4 is an exploded view of the rotor of the motor of FIG. 2.
Figure 5:
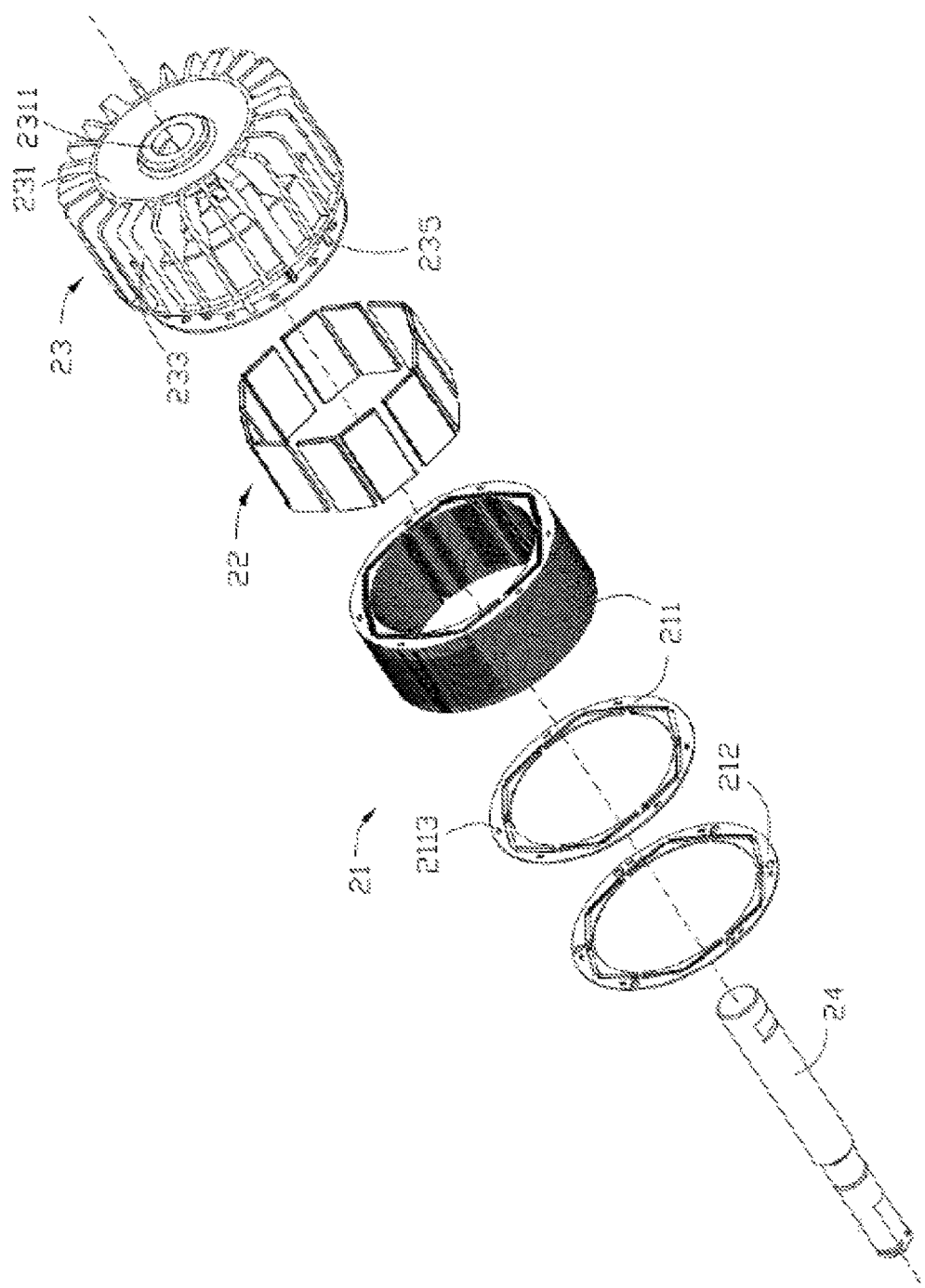
FIG. 5 is an exploded view of the rotor of the motor of FIG. 2, viewed from another aspect.

Referring also to FIG. 4 and FIG. 5, the rotor 20 includes a yoke 21, a plurality of permanent magnets 22, an end cap 23, and a rotary shaft 24.

The yoke 21 is a shape of hollow cylindrical, and includes a plurality of annular first laminations 211 and an annular second lamination 212. The second lamination 212 is disposed at one end of the yoke 21. The first laminations 211 and the second lamination 212 may be silicon steel sheets or laminations of other soft magnetic material. In this embodiment, the number of the second lamination 212 is one, and each of the first laminations 211 has the same thickness as the second lamination 212. The yoke 21 defines a plurality of first receiving slots 2111 through the first laminations 211 along the axial direction. Each first receiving slot 2111 has a substantially rectangular cross section. In this embodiment, each two adjacent first receiving slots 2111 are arranged in a V-shape opened towards a center of the yoke 21, and the two adjacent first receiving slots 2111 arranged in the V-shape are in communication with each other. One side of each first lamination 211 forms a plurality of protrusions 2112. In this embodiment, the number of the protrusions 2112 is six, and the six protrusions 2112 are arranged at even intervals. One side of the first lamination 211 opposite from the protrusions 2112 defines connecting grooves 2113 recessed toward the protrusions 2112, respectively. The yoke 21 further defines a plurality of second receiving slots 2121 through the second lamination 212, corresponding to the first receiving slots 2111. Each second receiving slot 2121 has a substantially rectangular cross section. In this embodiment, each two adjacent second receiving slots 2121 are arranged in a V-shape opened towards a center of the yoke 21, and the two adjacent second receiving slots 2121 arranged in the V-shape are in communication with each other. The second lamination 212 defines through slots 2122 corresponding to the protrusions 2112 of the first lamination 211. The second receiving slot 2121 is less than the first receiving slot 2111 in width. The yoke 21 is formed by stacking the plurality of first laminations 211 and the second lamination 212. Adjacent first laminations 211 are fixed by means of engagement between the protrusions 2112 and the connecting grooves 2113. The second lamination 212 is disposed at one end of the yoke 21, and the through slots 2122 of the second lamination 212 engagingly receive the protrusions 2112 of one adjacent first lamination 211, so as to connect the second lamination 212 with the first lamination 211.

Figure 7:
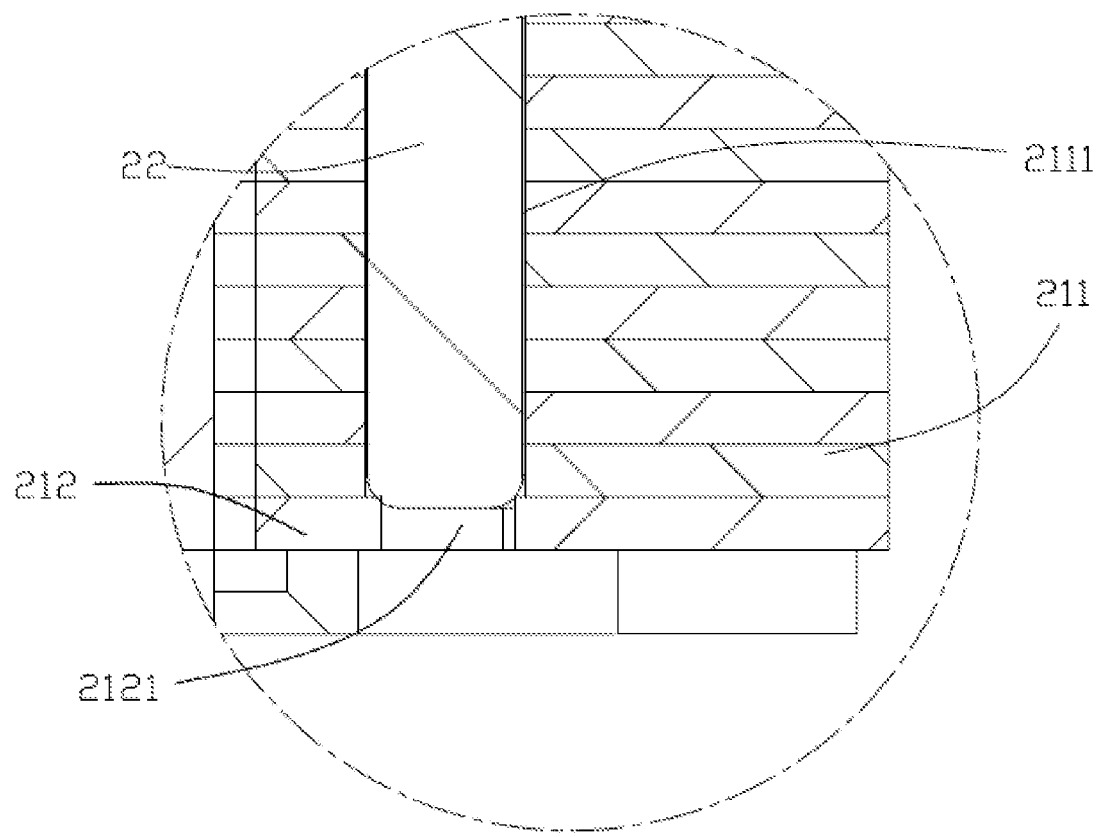
FIG. 7 is an enlarged view of the portion VII of FIG. 6.

Referring to FIG. 6 and FIG. 7, each permanent magnet 22 is substantially in the form of a rectangular block. A width of the permanent magnet 22 is greater than a width of the second receiving slot 2121 and is substantially the same as a width of the first receiving slot 2111. In this embodiment, because the width of the second receiving slot 2121 is less than the width of the permanent magnet 22, each permanent magnet 22 abuts against the second lamination 212 after being inserted into the first receiving slot 2111 of the yoke 21 from an end of the yoke 21 opposite from the second lamination 212. The permanent magnet 22 does not pass through the second receiving slot 2121 to become disengaged from the yoke 21. It is noted that the permanent magnet 22 can also be fixed in the first receiving slot 2111 using a small amount of glues.

The end cap 23 includes a bottom wall 231, a lateral wall 232, and a plurality of vanes 233. The bottom wall 231 is substantially a circular plate. The lateral wall 232 is annular. Each vane 233 is substantially L-shaped, which has one end connected to the bottom wall 231 and the other end connected to the lateral wall 232. The vanes 233 are arranged at even intervals surrounding the bottom wall 231 so as to dissipate heat when rotating along with the rotor 20. In particular, when the motor 100 operates, the vanes 233 rotate along with the rotor 20 to produce airflow to dissipate heat of the motor 100. At the same time, a plurality of openings 234 is formed between adjacent vanes 233, for allowing the airflow produced by the rotation of the vanes 233 to enter an interior of the rotor 20. A through hole 2311 is defined through a substantially central area of the bottom wall 231. One end of the rotary shaft 24 is inserted into the through hole 2311 to connect to the end cap 23, and the other end of the rotary shaft 24 passes through the bearing 15 and the accommodating hole 141. An annular bracket 235 is further connected to an inner side of the lateral wall 232. The annular bracket 235 includes two annular plates 2351 and a plurality of fixing poles 2352 disposed between the two annular plates 2351. One annular plate 2351 of the annular bracket 235 is connected to the inner side of the lateral wall 232, and the other annular plate 2351 is disposed at an end of the lateral wall 232 away from the bottom wall 231 and disposed outside the lateral wall 232. The yoke 21 is disposed between the two annular plates 2351 of the annular bracket 235. The end of the yoke 21 where the second lamination 212 is disposed is immediately adjacent the annular plate 2351 outside the lateral wall 232. Each of the fixing poles 2352 extends through the yoke 21 and is disposed between the first receiving slots 2111 that are in communication with each other for further fixing the corresponding permanent magnets 22. In fabrication and assembly of the rotor 20, the first laminations 211 and the second lamination 212 of the yoke 21 are sequentially stacked, and the plurality of permanent magnets 22 is received in the yoke 21. The yoke 21 and the rotary shaft 24 are placed in a corresponding mold, and the end cap 23 is formed by injecting plastic or rubber into the corresponding mold. The permanent magnets 22 are fixed in the yoke 21 by the formed end cap 23, and the yoke 21, the permanent magnets 22, the end cap 23 and the rotary shaft 24 are connected into a whole by injection molding.

In other embodiments, the end cap 23 further comprises a spoke, the spoke is configured to enhance the strength for supporting the vanes 233 of end cap 23. The spoke is fixed on the rotary shaft 24 before injection molding when fabrication and assembly of the rotor 20.

In this embodiment, a plurality of grooves 213 is defined in an inner surface of the yoke 21 along an axial direction thereof. The annular bracket 235 further includes a plurality of connecting poles 2353 corresponding to the grooves 213. Each of the connecting poles 2353 is received in a corresponding one of the grooves 213, for further fixing the yoke 21 as well as facilitating flow of plastic to form the end cap 23 during injection molding.

In the rotor 20 of this invention, the end cap 23 is formed by injection molding, and the yoke 21, the permanent magnets 22 and the rotary shaft 24 are connected into a whole at the same time of forming the end cap 23. The traditional aluminum end cap is replaced with the molded end cap, which makes the rotor 20 easier to fabricate and have a lighter weight and lower cost. In addition, the receiving slots of the first lamination 211 and the second lamination 212 are different in width, such that the permanent magnets 22 can be more conveniently received in the yoke 21, which avoids the use of glues to fix the permanent magnets 22. As the end cap 23 is formed by injection molding, the yoke 21 is directly fixed in the end cap 23. Therefore, additional fixing pins are no longer required to fix the yoke 21. Moreover, the number of the mold used during the fabrication of the yoke is not increased, which therefore does not increase the manufacturing burden.

Figure 8:
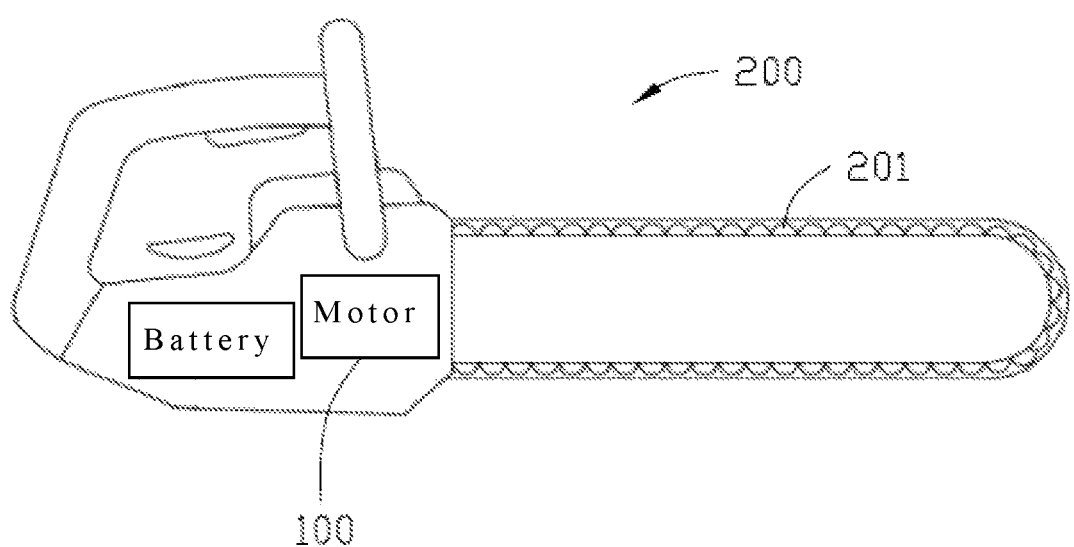
FIG. 8 illustrates an electric saw according to one embodiment of the present invention.

Referring to FIG. 8, the motor 100 of this embodiment can be used in an electric tool such as in an electric saw 200. The electric saw 200 includes a saw blade 201. The motor 100 is used to drive the saw blade 201. It should be understood that the motor 100 can also be used in other electric tools.

The above embodiments are merely to illustrate the technical solutions of the present invention and are not intended to limit the present invention. Although the present invention has been described with reference to the above preferred embodiments, it should be appreciated by those skilled in the art that various modifications and variations may be made without departing from the spirit and scope of the present invention.

The invention claimed is:

1. A rotor comprising:
a yoke;
a rotary shaft extending into the yoke; and
an end cap formed by injection molding,
wherein the end cap comprises two annular plates covering a top surface and a bottom surface of the yoke at an axial direction of the rotor respectively, the yoke defines a plurality of receiving slots along an axial direction of the yoke, each of the receiving slots receives a permanent magnet therein, and the permanent magnet is fixed in the yoke at the time of the injection molding, the end cap comprises a bottom wall, a lateral wall, and an annular bracket, the rotary shaft is connected to the bottom wall, the annular bracket is connected to an inner side of the lateral wall, the annular bracket comprises a plurality of fixing poles, the plurality of fixing poles is disposed between and connected to the two annular plates, and the fixing poles extend through the yoke and are immediately adjacent the permanent magnets.

2. The rotor of claim 1, wherein the yoke comprises a plurality of first laminations and a second lamination, the yoke defines a plurality of first receiving slots through all the first laminations along an axial direction of the yoke, each of the first receiving slots receives a permanent magnet therein, one end of the permanent magnet abuts against the second lamination, and the permanent magnet is fixed in the yoke at the time of the injection molding.

3. The rotor of claim 2, wherein the yoke defines a second receiving slot through the second lamination corresponding to each first receiving slot, and a width of the second receiving slot is less than a width of the permanent magnet.

4. The rotor of claim 2, wherein a plurality of protrusions protrudes from one side of the each first lamination facing the second lamination, the other side of the first lamination forms a plurality of connecting grooves corresponding to the protrusions, and one side of the second lamination facing the first lamination defines a plurality of through slots corresponding to the protrusions of the first lamination.

5. The rotor of claim 1, wherein one of the two annular plates is connected to the inner side of the lateral wall, and the other annular plate is disposed at one end of the lateral wall away from the bottom wall and disposed outside the lateral wall.

6. The rotor of claim 1, wherein a plurality of grooves is defined in an inner surface of the yoke along the axial direction of the yoke, the annular bracket includes a plurality of connecting poles corresponding to the grooves, the plurality of connecting poles is disposed between and connected to the two annular plates, and each of the connecting poles is received in a corresponding one of the grooves.

7. The rotor of claim 1, wherein the end cap further comprises a plurality of vanes, one end of each vane is connected to the bottom wall, the other end of each vane is connected to the lateral wall, an opening is defined between adjacent vanes, and airflow produced by rotation of the vanes enters an interior of the rotor via the opening to dissipate heat of the rotor.

8. The rotor of claim 1, wherein the permanent magnet is rectangular in shape.

9. A motor comprising:
   a rotor comprising:
      a yoke;
      a rotary shaft extending into the yoke; and
      an end cap formed by injection molding, wherein the end cap comprises two annular plates covering a top surface and a bottom surface of the yoke at an axial direction of the rotor respectively; and
   a stator comprising a stator core and a plurality of stator windings, the stator windings wound around the stator core, and the stator core received in the yoke,
   wherein the yoke comprises a plurality of first laminations and a second lamination, the yoke defines a plurality of first receiving slots through all the first laminations along an axial direction of the yoke, each of the first receiving slots receives a permanent magnet therein, one end of the permanent magnet abuts against the second lamination, and the permanent magnet is fixed in the yoke at the time of the injection molding, the yoke defines a second receiving slot through the second lamination corresponding to each first receiving slot, and a width of the second receiving slot is less than a width of the permanent magnet.

10. The motor of claim 9, wherein the yoke defines a plurality of receiving slots along an axial direction of the yoke, each of the receiving slots receives a permanent magnet therein, and the permanent magnet is fixed in the yoke at the time of the injection molding.

11. The motor of claim 9, wherein the yoke comprises a plurality of first laminations and a second lamination, a plurality of protrusions protrudes from one side of the each first lamination facing the second lamination, the other side of the first lamination forms a plurality of connecting grooves corresponding to the protrusions, and one side of the second lamination facing the first lamination defines a plurality of through slots corresponding to the protrusions of the first lamination.

12. The motor of claim 9, wherein the end cap comprises a plurality of vanes, an opening is defined between adjacent vanes, and airflow produced by rotation of the vanes enters an interior of the rotor via the opening to dissipate heat of the rotor.

* * * * *